(12) United States Patent
Sauber

(10) Patent No.: US 7,603,571 B2
(45) Date of Patent: Oct. 13, 2009

(54) SYSTEM AND METHOD FOR REGULATING THE POWER CONSUMPTION OF A COMPUTER SYSTEM

(75) Inventor: William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 10/961,360

(22) Filed: Oct. 8, 2004

(65) Prior Publication Data

US 2006/0080559 A1    Apr. 13, 2006

(51) Int. Cl.
G06F 1/00 (2006.01)
(52) U.S. Cl. ...................................... 713/300
(58) Field of Classification Search ................. 713/300
See application file for complete search history.

(56) References Cited

U.S. PATENT DOCUMENTS

| | | |
|---|---|---|
| 4,181,950 A | 1/1980 | Carter, II |
| 4,347,575 A | 8/1982 | Gurr et al. |
| 5,486,726 A | 1/1996 | Kim et al. |
| 5,504,907 A | 4/1996 | Stewart et al. |
| 5,664,202 A | 9/1997 | Chen et al. |
| 5,996,084 A | 11/1999 | Watts |
| 6,229,432 B1 | 5/2001 | Fridley et al. |
| 6,367,023 B2 | 4/2002 | Kling et al. |
| 6,400,103 B1 | 6/2002 | Adamson |
| 6,564,332 B1 | 5/2003 | Nguyen et al. |
| 6,574,740 B1 * | 6/2003 | Odaohhara et al. .......... 713/323 |
| 6,622,097 B2 | 9/2003 | Hunter |
| 6,625,740 B1 * | 9/2003 | Datar et al. ................. 713/324 |
| 7,032,119 B2 | 4/2006 | Fung |
| 7,039,821 B1 * | 5/2006 | Potega ........................ 713/340 |
| 7,240,225 B2 | 7/2007 | Brewer et al. |
| 2003/0204762 A1 * | 10/2003 | Lee et al. ..................... 713/322 |
| 2004/0148528 A1 * | 7/2004 | Silvester ..................... 713/300 |
| 2004/0236969 A1 * | 11/2004 | Lippert et al. ............... 713/300 |
| 2005/0172158 A1 * | 8/2005 | McClendon et al. ........ 713/300 |
| 2006/0095807 A1 * | 5/2006 | Grochowski et al. ........ 713/324 |
| 2007/0271477 A1 | 11/2007 | Brewer et al. |

* cited by examiner

Primary Examiner—Thomas Lee
Assistant Examiner—Mohammed H Rehman
(74) Attorney, Agent, or Firm—Baker Botts L.L.P.

(57) ABSTRACT

A system and method for regulating the power consumption of a computer system is disclosed. The power supplied to the computer system is evaluated. If the power supplied to or delivered by the computer system is sufficiently substandard, a command is issued to cause the components of the computer system to enter a reduced power condition.

17 Claims, 2 Drawing Sheets

SYSTEM AND METHOD FOR REGULATING THE POWER CONSUMPTION OF A COMPUTER SYSTEM

TECHNICAL FIELD

The present disclosure relates generally to computer systems and information handling systems, and, more particularly, to a system and method for regulating the power consumption of a computer system on the basis of input characteristics of power input to the computer system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computer system or information handling system will typically include a power supply that is coupled to the alternating current power input of the computer system. The power supply converts the alternating current input to one or more direct current voltages that are delivered to the components of the computer system, including the processor of the computer system. Power supplies are designed to tolerate some degree of input power abnormalities at a rated load, an irregularity in the input power supply may cause the regulated output of the power supply to fall below an established threshold level. When this situation occurs, a power-good signal in the computer system is deasserted, causing the computer system to immediately reset.

SUMMARY

In accordance with the present disclosure, a system and method is disclosed for regulating the power being consumed by the computer system on the basis of an analysis of the characteristics of the power being supplied to the computer system. The system and method disclosed herein measures the characteristics or quality of the input power source to the computer system. This measurement is passed to an evaluation module. In addition, the system and method disclosed herein passes a signal to the evaluation module that reflects the power being consumed by the computer system. On the basis of these measurements, the evaluation module can issue a command to the computer system that causes the computer system to enter a reduced power state.

The system and method disclosed herein is technically advantageous because it provides a technique for recognizing a poor power condition in the computer system and reducing the power consumed by the computer system as a result. Reducing the power consumed by the computer system reduces the power load of the system components and reduces the strain on the power delivery components of the computer system. Because the load being served by the regulators of the computer system is reduced, the regulators of the computer system are more likely to be able to serve the computer system without causing the power good signal to be deasserted and resetting the computer system.

Another technical advantage of the system and method disclosed herein is that the system is dynamic and involves the continual evaluation of the power condition of the computer system. As such, if the power condition of the computer system degrades quickly, the computer system can quickly be placed in a reduced power condition. Another technical advantage of the system and method disclosed herein is that the system may evaluate the power condition of the computer system on the basis of the input power signal an indication of the power being consumed by the computer system. In this manner, the decision to place the computer system in a reduced power state or remove the computer system from a reduced power state, is based on both the input power signal and an assessment of the current power consumption of the computer system.

The system and method disclosed herein is also technically advantageous in that the system and method can be used to determine the point at which a previously asserted power reduction can be released, thereby allowing the system components to exit any reduced power state. As such, the system and method disclosed herein includes a continuous, dynamic process that monitors the power condition of the computer system to determine if the computer system should be transition from its current full power or reduced power state. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The system and method disclosed herein involves a technique for evaluating the characteristics of the input power signal to a computer system. If necessary, the computer system can be placed in a reduced power state in response to the evaluated characteristics of the input power signal. The placement of the computer system in a reduced power state will reduce the load of the computer system. Because the load of the computer system is reduced, the stored energy of the regulators of the computer system will dissipate at a slower rate, and the computer system will remain in an operational state for a longer period.

Figure 1:
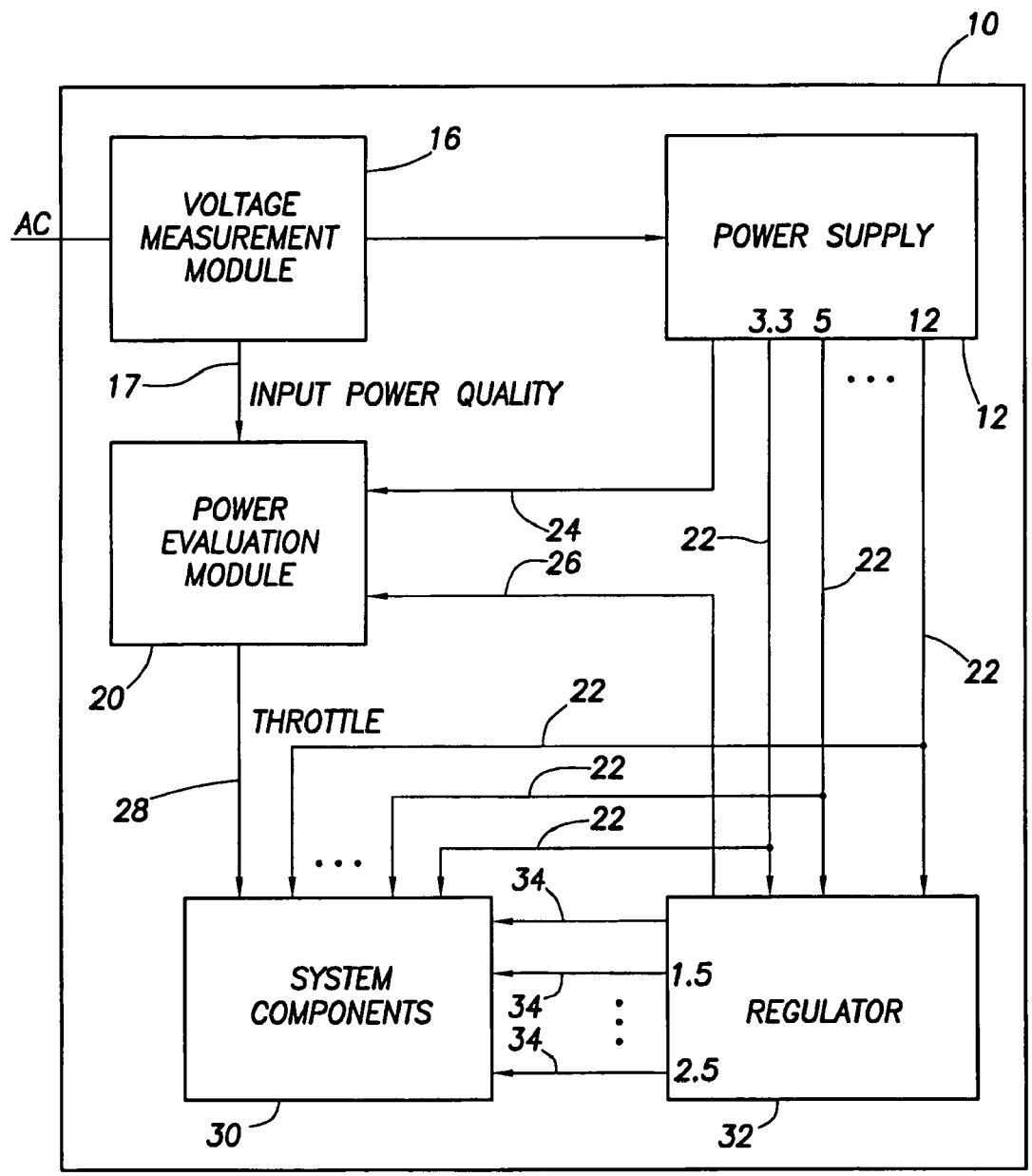
FIG. 1 is a block diagram of a computer system.

Shown in FIG. 1 is a block diagram of a computer system 10, which includes a power supply 12. The computer system 10 includes a processor, a memory, and other standard components of a computer system. Computer system 10 includes a system regulator 32 and a set of on-board system components, which are indicated at 30 and include a processor. Computer system 10 includes a voltage measurement module 16. Voltage measurement module 16 is coupled to and receives the alternating current input power source for computer system 10.

Voltage measurement module measures a set of quantifiable characteristics of the alternating current input voltage. These characteristics may include the amplitude of the alternating current input voltage, the peak-to-peak voltage of the signal, root mean square value of the power signal, or the frequency of the power signal. By evaluating these characteristics, voltage measurement module 16 will recognize abnormalities in the input voltage, including temporary discontinuities in the input voltage. Voltage measurement module 16 passes the alternating current input voltage to power supply regulator 18. Voltage measurement module 16 transmits a measurement signal 17, which represents the results of the measurements of the alternating current input voltage, to a power evaluation module 20.

Power supply 12 generates multiple direct current voltages for delivery to the computer system. The alternating current input to the computer system and the direct current voltage outputs of the regulators are referred to herein as power signals. As indicated in FIG. 1, power supply 12 provides direct current voltages of 3.3 volts, 5 volts, and 12 volts through power supply connections 22 to a system regulator 22 and system components 30. Power supply 12 transmits a power level indicator signal 24 to power evaluation module 20. Power level indicator signal 24 identifies the amount of current being drawn by the load of the power supply regulator. In the example of FIG. 1, power level indicator signal is a signal that serves as a composite of the current being drawn by each of the discrete regulators that comprise power supply 12. In an alternate embodiment, each discrete regulator of power supply 12 may supply a unique power level indicator signal to power evaluation module 20.

System regulator 32 receives a set of direct current voltages from power supply 12 and produces as an output a series of direct current voltages, which are supplied over voltage lines 34 to the system components 30, including the processor of the computer system. In FIG. 1, the outputs of system regulator 32 are direct current voltages 1.5 volts and 2.5 volts. Like power supply 12, system regulator 32 provides a power level indicator signal 26 to power evaluation module 20. Power level indicator signal 26 identifies the amount of current being drawn by the load coupled to system regulator 32. In the example of FIG. 1, power level indicator signal 26 is a composite signal that reflects the current drawn by each of the discrete regulators within system regulator 32. Alternatively, each discrete regulator of system regulator 32 could provide a unique power level indicator signal to power evaluation module 20.

In operation, power evaluation module 20 determines whether the computer system should be placed in a reduced power state due to abnormalities in the alternating current input power signal. Power evaluation module 20 evaluates the power condition of the computer system. As used herein, the term power condition refers the amount of power being drawn by the computer system as compared to the quality of the input power signal to the computer system. Power evaluation module 20 evaluates the power condition of the computer system on the basis of measurement signal 17, power level indicator signal 24, and power level indicator signal 26. Power level evaluation module 20 determines if the input power signal supplied to the computer system is sufficiently substandard as compared to the power being drawn by the components of the computer system. If it is determined by the evaluation module that the components of the computer system are drawing too much to power to be adequately served by a substandard input power signal, the computer system is placed in a reduced power state.

The identification of a discontinuity or other failure in the alternating current input voltage is made by power evaluation module 20 solely on the basis of the measurement signal 17 and without reference to power level indicator signals 24 and 26. If measurement signal 17 indicates that alternating current input voltage is sufficiently substandard in some respect, the components of the computer system are placed in a reduced power state. As an example, if voltage measurement module 16 communicates through power evaluation module 17 that there is a discontinuity in the alternating current input voltage, power evaluation module issues a signal to place the components of the computer system, including the processor of the computer system, in a reduced power state. As such, power evaluation module 20 can place the computer system in a reduced without reference to power level indicator signals 24 and 26.

Power evaluation module 20 can also evaluate the power condition of the computer system on the basis of both the measurement signal 17 and the power level indicator signals 24 and 26 from the regulators of the computer system. The power level indicator signals are in the form of feedback signals that identify the current being drawn by the load coupled to each regulator. Either or both of the power level indicator signals may indicate (a) that the computer system is drawing a low amount of current and can thereby more easily tolerate a substandard input power signal; or (b) that the computer system is drawing a high amount of current and cannot therefore tolerate even the slightest abnormality in the input current signal. With respect to the first condition outlined above, because the computer system is drawing a relatively low amount of current, and is therefore in a lower power state, power evaluation module 20 may determine that the computer system need not be placed in a reduced power state despite an abnormal condition at the input power signal. In this situation, despite the substandard state of the alternating current input voltage, the current being drawn by the computer system is sufficient low that the current drawn will not quickly deplete the stored energy of the voltage regulators of the computer system. In the second condition outlined above, because the computer system is drawing a high amount of current, even the slightest abnormality in the input power signal will necessitate that the computer system be put in a reduced power condition. As such, because a high amount of current is being drawn, even the slightest discontinuity in the alternating current input voltage will result in the depletion of the stored energy of the voltage regulators of the computer system.

When power evaluation module 20 determines that the computer system should be placed in a reduced power state, power evaluation module 20 issues a throttle signal 28 to the system components 30 of the computer system. The purpose of the throttle command is to reduce the power being consumed by the system components by reducing the operating speed or frequency of the component or by otherwise placing the component in an operating state that reduces the power being consumed by the component. Although FIG. 1 depicts a throttle signal being issued to the system components of the computer system, it is also possible for the throttle signal to be issued only to the processor of the computer system. A throttle signal issued to the processor of the computer system will cause the processor to operate at a reduced operating speed, which reduces the processor's power consumption rate and has the effect of reducing the power consumed by other components of the computer system.

The system and method disclosed herein can be used to place the computer system in a reduced power condition and remove the computer system from a reduced power condition. After the computer system has been placed in a reduced power condition, the measurement module and the evaluation module can continue to monitor the power condition of the computer system to evaluate whether the input power signal is sufficient to accommodate a release of the reduced power state. When the status of the power signals supplied in the computer system returns to a satisfactory level, the assertion of the throttle condition can be released and the affected system components can return to their normal operating condition. To avoid a state in which the computer system is repeatedly transitioned between a reduced power state and a full power state, the evaluation module may include a hysteresis condition or effect so that the computer system remains in a stable full power or reduced power state for a longer period.

Figure 2:
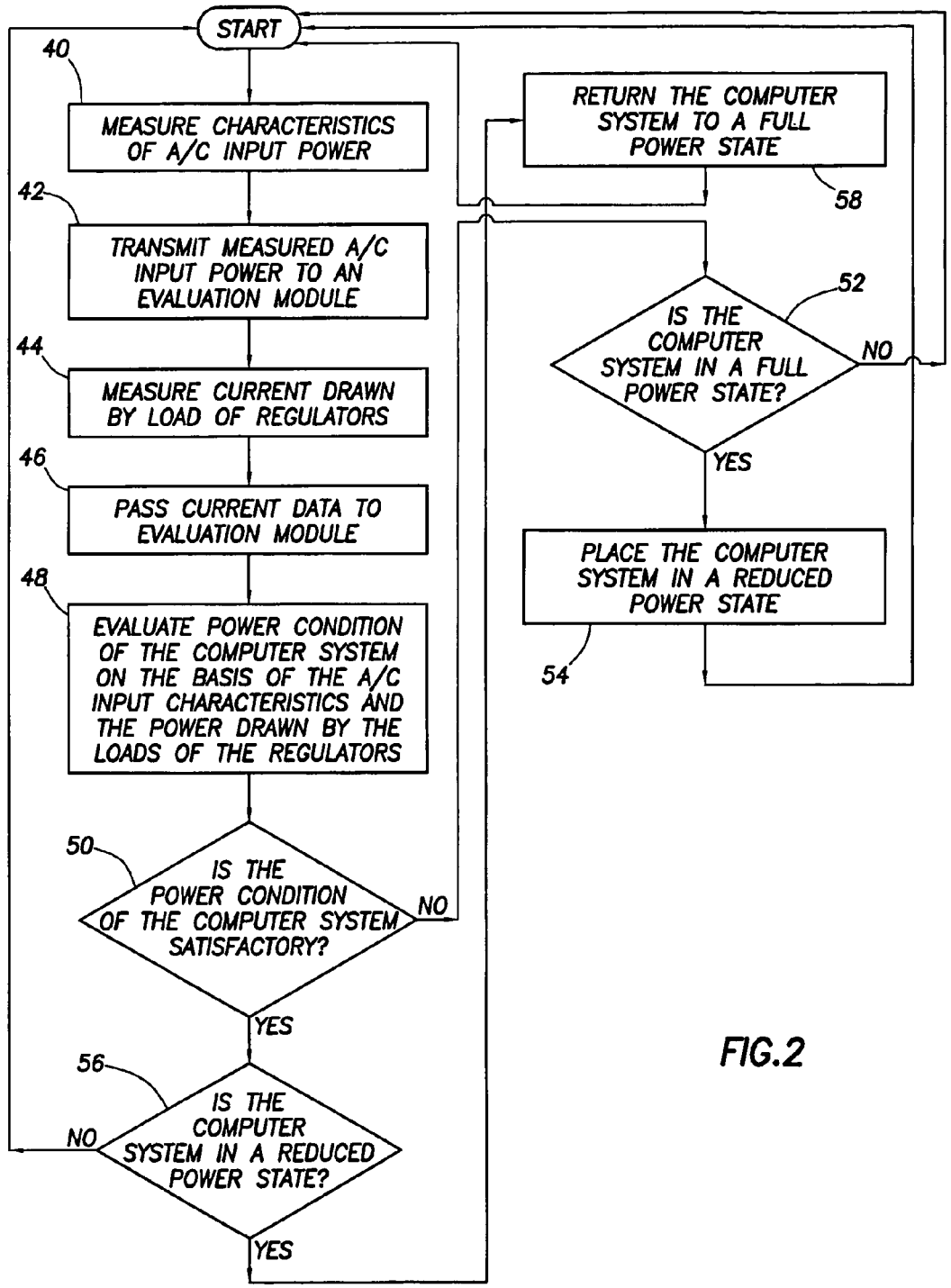
FIG. 2 is a flow diagram of a method for evaluating the power condition of a computer system and entering into or exiting from a reduced power condition on the basis of the evaluated power condition.

Shown in FIG. 2 are a series of method steps for identify, regulating, and modifying the power state of the computer system on the basis of the measured characteristics of the input power signal and the power being consumed by the computer system. Following the START step, the voltage measurement module 16 at step 40 measures the characteristics of the alternating current input power. At step 42, a measurement signal indicative of the measured characteristics of the alternating current input power is transmitted to power evaluation module 20. At step 44, the current being drawn by the loads of each of the regulators of the system is measured, and, at step 46, a signal indicative of the measured amperage is passed to power evaluation module 20. At step 48, the power condition of the computer system is evaluated on the basis of the characteristics of the input power signal and the current drawn by the regulators of the system. At step 50, an evaluation is made as to whether the power condition of the computer system is satisfactory. If it is determined at step 50 that the power condition of the computer system is not satisfactory, it is determined at step 52 if the computer system is in a full power state. If the computer system is in a full power state, the computer system is transitioned to a reduced power state at step 54 and the flow diagram continues with the START step. The computer system can be placed in a reduced power state through the issuance of a throttle command. If it is determined at step 52 that the computer system is already in a reduced power state, which may occur as a result of the previous issuance of a throttle command, the flow diagram loops back to the START step for the continued analysis of the power condition of the computer system.

If it is determined at step 50 that the power condition of the computer system is satisfactory, it is next determined at step 56 if the computer system is in a reduced power state. If the computer system is in a reduced power state, the computer system is transitioned to a full power state at step 58 and the flow diagram loops to the START step for the continued monitoring of the computer system. If the computer system is a full power state, no change is needed to the power state of the computer system and the flow diagram continues with the START step. Steps 54 and 58, which involve the transition of the computer system to and from and full power state, may include a hysteresis limitation that prevents a transition until the power condition of the computer system has reached a threshold value or level.

As is demonstrated in FIGS. 1 and 2, the system and method disclosed herein includes a feedback loop that provides to the evaluation module an indication of the power being drawn by the loads of each of the regulators of the computer system. In this manner, the actual operation of the regulators and power draw of the components of the computer system is evaluated when determining if the computer system should be placed in a reduced power state or if a computer system in a reduced power state should be transitioned to a full power state. The system and method disclosed herein is also dynamic in that the system evaluates the power condition of the computer system on a real-time and continuous basis. In this manner, the method described herein can quickly move the computer system into a throttle condition and can quickly deassert the throttle condition when the power condition of the computer system sufficiently improves. The evaluated power condition triggers for asserting or deasserting a throttle condition in a computer system may be set at threshold values that would prevent the computer system from cycling quickly back and forth between a throttle condition and a normal operating condition.

The application of a throttle command could also be applied on a stairstep basis to increase in increments or decrease in increments the operating speed of one or more components of the computer system. As an example, if there is a deficiency in the alternating current input voltage, a throttle signal can be issued by the power evaluation module to the processor of the computer system to reduce the operating speed of the processor. The reduction in the operating speed of the processor need not necessarily result in the processor being placed at its lowest possible operating speed. The throttle signal may reduce the operating speed of the processor by a preestablished amount that reflects the amount of current being drawn by the components of the computer system and the rate of depletion of stored energy in the regulators of the computer system. Also, when a throttle condition is deasserted from a processor of the computer system, the throttle condition can be deasserted so that the operating speed of the processor is raised in increments to reflect the improving status of the alternating current input voltage and the stored energy of the regulators of the computer system.

Although the power supply throttling system shown herein has been described with respect to the throttling of components on the motherboard of system board of a computer system, it should be recognized that the system and method shown herein may be applied for the purpose of reducing the power consumed by components of the computer system that are not located on the motherboard of the computer system. It should also be recognized that the throttle command could only be applied to the processor of the computer system. Although the present invention has been described with respect to alternating current input power, it should be recognized that the system and method described herein may be employed with respect to any input power source and is not limited to alternating current input power sources. Although the present disclosure has been described in detail, it should be understood that various changes, substitutions, and alterations can be made hereto without departing from the spirit and the scope of the invention as defined by the appended claims.

What is claimed is:

1. An information handling system, comprising:
    an input power source, wherein the input power source is an alternating current power source;
    a power measurement module coupled to the input power source and operable to measure a set of quantifiable characteristics of the input power source;
    a power evaluation module operable to receive a measurement signal from the power measurement module;
    a power supply coupled to the power measurement module and operable to provide a power level indicator signal to the power evaluation module;
    a plurality of system components, wherein the plurality of system components includes at least one processor;
    a system regulator coupled to the power supply and providing to the power evaluation module a measurement signal related to power being consumed by the plurality of system components;
    wherein the power evaluation module evaluates a power source condition of the input power source on the basis of the measurement signal from the power measurement module and the power level indicator signal from the power supply; and
    wherein the power evaluation module is operable to issue a throttle command to the processor to place the processor in a reduced power mode if the power source condition of the input power source is sufficiently substandard.

2. The information handling system of claim 1, wherein the system regulator provides at least one direct current power signal to a component of the information handling system.

3. The information handling system of claim 2, wherein the evaluation module evaluates the power condition of the information handling system on the basis of the power level indicator signals from each of the power measurement module, the power supply, and the system regulator.

4. The information handling system of claim 3, wherein the issuance of the throttle command results in the processor operating at a reduced operating speed.

5. The information handling system of claim 3, wherein the issuance of the throttle command results in one or more of the system components entering a state of reduced power consumption.

6. The information handling system of claim 1, wherein the power level indicator signal received from the power measurement module relates to the characteristics of an alternating current input power source to the information handling system.

7. A method for monitoring the power condition of a computer system, the computer system comprising a system regulator, comprising:
    measuring one or more alternating current characteristics of an alternating current power source;
    transmitting the measured alternating current characteristics to an evaluation module;
    receiving at the evaluation module information concerning the power being consumed by the computer system;
    evaluating an alternating current power condition of the alternating current power source on the basis of the measured alternating current characteristics of the alternating current power source, wherein the evaluation module is operable to issue a throttle command to the computer system if the alternating current power condition is sufficiently substandard; and
    wherein the system regulator is coupled to the alternating current power source and is operable to provide to the evaluation module a power level indicator signal related to power being consumed by the computer system;
    determining that the alternating current power condition of the computer system is substandard; and
    placing the computer system in a reduced power condition if the computer system is not in a reduced power condition.

8. The method for monitoring the power condition of a computer system of claim 7, further comprising the step of issuing a throttle command if the alternating current power condition of the computer system is determined to be substandard.

9. The method for monitoring the power condition of a computer system of claim 8, wherein:
    at least one of the system components of the computer system is a processor; and
    the issuance of the throttle command causes the processor of the computer system to operate at a reduced operating speed.

10. The method for monitoring the power condition of a computer system of claim 8, wherein the issuance of the throttle command causes a plurality of the system components of the computer system to enter a reduced power state.

11. The method for monitoring the power condition of a computer system of claim 7, wherein the step of placing the computer system in a reduced power condition comprises the step of issuing a throttle command to one or more system components of the computer system.

12. The method for monitoring the power condition of a computer system of claim 7, further comprising the steps of:
    determining that the alternating current power condition of the computer system is not substandard; and
    releasing the computer system from a reduced power condition if the computer system is in a reduced power condition.

13. The method for monitoring the power condition of a computer system of claim 12, wherein the step of releasing the computer system from a reduced power condition comprises the step of issuing a command that deasserts a previously asserted throttle command to the computer system.

14. A method for regulating the power consumed by a computer system in response to the quality of the power being supplied to the computer system, the computer system comprising a system regulator, comprising:
    measuring one or more alternating current characteristics of an alternating current power source to a computer system;
    measuring one or more quantifiable characteristics of alternating current power source to the computer system;
    evaluating, at an evaluation module, the power being consumed by the components of the computer system, wherein a system regulator is coupled to the evaluation module and a power supply and is operable to provide a measurement signal related to the power being consumed by the components of the computer system;

analyzing the measured alternating current characteristics of the alternating current power source to determine if an alternating current power condition of the alternating current power source is substandard;

placing one or more components of the computer system in a reduced power state if the power condition of the computer system is determined to be substandard or if the alternating current power condition of the alternating current power source is determined to be substandard; and wherein the step of analyzing comprises the step of analyzing the measured characteristics of the alternating current power source and the power being consumed by the components of the computer system to determine if the alternating current power condition of the computer system is substandard or if the alternating current power condition of the alternating current power source is substandard.

15. The method for regulating the power consumed by a computer system in response to the quality of the power being supplied to the computer system of claim 14, wherein the step of placing the components of the computer system in a reduced power state if the alternating current power condition of the computer system is determined to be substandard comprises:

determining that the computer system is not in a reduced power state; and placing the components of the computer system in a reduced power state.

16. The method for regulating the power consumed by a computer system in response to the quality of the power being supplied to the computer system of claim 15, further comprising the step of releasing the computer system from a reduced power state if the power condition of the computer system is not determined to be substandard.

17. The method for regulating the power consumed by a computer system in response to the quality of the power being supplied to the computer system of claim 16, wherein the step of releasing the computer system from a reduced power state if the power condition of the computer system is not determined to be substandard, wherein the step of placing the components of the computer system in a reduced power state if the alternating current power condition of the computer system is determined to be substandard comprises the step of issuing a throttle command to one or more of the components of the computer system comprises:

determining that the computer system is in a reduced power state; and releasing the components of the computer system from the reduced power state.

* * * * *

UNITED STATES PATENT AND TRADEMARK OFFICE
CERTIFICATE OF CORRECTION

PATENT NO.        : 7,603,571 B2                                    Page 1 of 1
APPLICATION NO. : 10/961360
DATED             : October 13, 2009
INVENTOR(S)       : William F. Sauber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Fifth Day of October, 2010

David J. Kappos
*Director of the United States Patent and Trademark Office*